United States Patent [19]

Keegel, Jr.

[11] Patent Number: 5,538,532
[45] Date of Patent: Jul. 23, 1996

[54] METHODS FOR RECYCLING ELECTRIC ARC FURNACE DUST

[75] Inventor: Joseph F. Keegel, Jr., Spring Lake, N.J.

[73] Assignee: Complete Recovery Process, Spring Lake, N.J.

[21] Appl. No.: 397,409

[22] Filed: Mar. 2, 1995

[51] Int. Cl.$^6$ .............................. C21B 11/10; C22B 7/02
[52] U.S. Cl. .................... 75/10.63; 75/10.22; 75/420; 423/108
[58] Field of Search ................................. 75/10.29, 10.3, 75/10.31, 10.32, 724, 725, 961, 10.22, 10.63, 420; 423/108

[56] References Cited

U.S. PATENT DOCUMENTS

| | | | |
|---|---|---|---|
| 3,196,001 | 7/1965 | Marvin | 75/21 |
| 3,440,155 | 4/1969 | Pickering et al. | 204/119 |
| 4,071,357 | 1/1978 | Peters | 75/103 |
| 4,072,503 | 2/1978 | Petterson et al. | 75/14 |
| 4,572,822 | 2/1986 | Abe et al. | 423/37 |
| 4,673,431 | 6/1987 | Briemont | 75/25 |
| 4,676,828 | 6/1987 | Andre | 75/101 R |
| 4,800,069 | 1/1989 | Fray | 423/97 |
| 4,904,459 | 2/1990 | Kolkmann et al. | 423/305 |
| 5,004,496 | 4/1991 | Aune et al. | 75/10.28 |
| 5,013,532 | 5/1991 | Sresty | 423/88 |
| 5,028,410 | 7/1991 | Spink et al. | 423/622 |
| 5,082,493 | 1/1992 | Barrett et al. | 75/743 |
| 5,186,741 | 2/1993 | Kotraba et al. | 75/961 |
| 5,204,084 | 4/1993 | Robinson et al. | 423/622 |
| 5,286,465 | 2/1994 | Zaromb et al. | 423/106 |
| 5,336,297 | 8/1994 | McElroy | 75/725 |
| 5,338,336 | 8/1994 | Greenwalt | 75/445 |

FOREIGN PATENT DOCUMENTS 1086075  9/1980  Canada .

OTHER PUBLICATIONS

Altepeter, Michael, et al., "Proposed Treatment Neutral Leach Residue," Residues and Effluents Processing and Environmental Considerations, The Minerals, Metals & Materials Society, pp. 449–459 (1991).

Arthur D. Little, Inc., Cambridge, MA, "Electric Arc Furnace Dust—1993 Overview, A Summary of Dust Generation, Status of Regulations, Current and Emerging Treatment Processes, and Processing Costs," CMP Report No. 93–1 (Jul. 1993).

Ashman, D. W., et al., "Recent Experience with Zinc Pressure Leaching at Cominco," Lead–Zinc'90, The Minerals, Metals & Materials Society, pp. 253–275 (1990).

Barrett, E. C., et al., "A Hydrometallurgical Process to Treat Carbon Steel Electric Arc Furnace Dust," *Hydrometallurgy*, 30, pp. 59–68 (1992).

(List continued on next page.)

Primary Examiner—Melvyn Andrews
Attorney, Agent, or Firm—Woodcock Washburn Kurtz Mackiewicz & Norris

[57] ABSTRACT

A method for the separation and recovery of metals selected from the group consisting of iron, cadmium, zinc, and lead, from raw material comprising a mixture of metals, which comprises the steps of heating the raw material to a temperature sufficient to substantially vaporize cadmium, zinc, and lead, and insufficient to substantially vaporize iron; separating secondary dust and vapors produced during the first step from the residual sinter mass, which mass comprises iron; slurrying the secondary dust in an aqueous solution of ammonia ammonium carbonate to dissolve zinc and cadmium; separating a zinc/cadmium bearing leach liquor from substantially insoluble lead containing particles by filtration; treating the zinc/cadmium bearing leach liquor to recover cadmium by adding metallic zinc to the leachate to produce a cadmium containing cement; separating the cement from the leach liquor; and removing ammonia from the leach liquor to precipitate basic zinc carbonate. The methods of the invention are especially suitable for treating electric arc furnace dusts.

15 Claims, 1 Drawing Sheet

PROCESS BLOCK FLOW

OTHER PUBLICATIONS

Bauer, Karl–Heinz, et al., "Recycline Of Iron And Steelworks Wastes Using The Inmetco Direct Reduction Process," Reprint from MPT–Metallurgical Plant and Technology International, Issue No. Apr. 1990, pp. 74–87 (1990).

Bautista, R. G., "Advances in Chemical Engineering," *Hydrometallurgy*, edited by T. B. Draw et al., vol. 9, pp. 1–110, (1974).

Bess, M., "Recycling of Zinc," *Recycling of Nonferrous Alloys—Special Engineering Topics*, Oct. 1990 pp. 1223–1226.

Bethleham Steel Corporation, Research Department, Technology Group, "Electric Arc Furnance Dust: Disposal, Recycle, and Recovery," Report No. 85-2, Project No. RP–2570–1–2 (May 1985).

Bounds, C. O., et al., "EAF Dust Processing in the Gas-Fired Flame Reactor Process," Lead–Zinc, '90, The Minerals, Metals & Materials Society, pp. 511–528 (1990).

Bratt, G. C., et al., "Production of Lead Via Ammoniacal Ammonium Sulfate Leaching," *Metallurgical Transactions*, vol. 1, pp. 2141–2149 (Aug. 1970).

Bunney, David T., et al., "The Commercial Development Of Plasma Technology: EAF Dust Applications," Residues and Effluents—Processing and Environmental Considerations, The Minerals, Metals & Materials Society, pp. 213–218 (1991).

Caron, M. H., "Ammonia Leaching of Nickel and Cobalt Ores," *Journal of Metals, Transactions AIME*, vol. 188, pp. 67–90 (Jan. 1950).

Caron, M. H., "Nickel and Cobalt," *Journal of Metals, Transactions AIME*, vol. 188, pp. 91–103 (Jan. 1950).

Castro, Fenando, "Some Alternative Approaches For The Treatment Of Electric Furnace Steelmaking Dusts," Residues and Effluents—Processing and Environmental Considerations, The Minerals, Metals & Materials Society, pp.179–211 (1991).

Cowx, P., et al., "The Processing of Electric Arc Furnace Baghouse Dusts in the Tetronics Plasma Furnace," Lead–Zinc '90, The Minerals, Metals & Materials Society, pp. 497–510 (1990).

"Leaching Helps to Recover Metals from Complex Ores," *Chemical Engineering*, pp. 14, 15, 17, 19 (Jan. 6, 1986).

Cruells, M., et al., "Electric Arc Furnace Flue Dusts: Characterization and Leaching with Sulphuric Acid," *Hydrometallurgy*, 31, pp. 213–231 (1992).

Downey, J. P., et al., "Removal of Halogens from EAF Dust by Pyrohdrolysis," Residues and Effluents—Processing and Environmental Considerations, The Minerals, Metals & Materials Society, 1991.

Dreisinger, D. B., et al., "The Hydrometallurgical Treatment of Carbon Steel Electric Arc Furnace Dusts by the UBC–Chaparral Process," *Hydrometallurgy*, 25, pp. 137–152 (1990).

Ek, Roger B., "Glassification of Electric Arc Furance Dust," *Iron and Steel Engineer*, pp. 82–84 (Apr. 1993).

Farnsworth, M., et al., "Zinc Chemicals," Zinc Development Association, London, Zinc Institute Inc., New York, NY, pp. 2, 3, 62–65, First Ed. 1973.

Fosnacht, Donald R., "Recycling of Ferrous Steel Plant Fines, State–of–the–Art," *I&SM*, pp. 22–26 (Apr. 1981).

Fray, Derek J., "Treatment Of Electric arc Furance Dust Using Chlorine/Air," Extraction and Processing for the Treatment and Minimization of Wastes, The Minerals, Metals & Materials Society, pp. 627–636 (1993).

Frenay, Jean, "Leaching of Oxidized Zinc Ores in Various Media," *Hydrometallurgy*, 15, pp. 243–253 (1985).

Gabler, Jr., R. C., et al., "Metal Recovery From Secondary Copper Converter Dust by Ammoniacal Carbonate Leaching," Bureau of Mines, United States Department of the Interior, No. 9199, pp. 1–8.

Geutskens, Ing. R., "Pressure Leaching of Zinc–Bearing Blast Furnace Dust," Lead–Zinc '90, The Minerals, Metals & Materials Society, pp. 529–545 (1990).

Grebe, K., et al., "High Residue–Free Iron And Zinc Recovery From Integrated Steel Plant Wastes With Less Than 2% Zinc Plus Lead," Reprint from 1991 Iromaking Conference, Washington, D.C., Apr. 14–17, 1991.

Gress, Lester, "Recycling Vitrification Process for Electric Arc Furnace Dust," *Iron and Steel Engineer*, pp. 38–40 (Aug. 1993).

Habashi, F., "Principles of Extrative Metallurgy," *Hydrometallurgy*, vol. 2, May 1970, pp. 46–283.

Hagni, Ann M., et al., "Reflected Light and Scanning Electron Microscopic Study Of electric Arc Furnance (EAF) Dusts," Residues and Effluents—Processing and Environmental Considerations, The Minerals, Metals & Materials Society, pp. 117–125 (1991).

Hampel, C. A., "Zinc and Cadmium Electrowinning," *The Encyclopedia of Electrochemistry*, Reinhold Publishing, Inc. (1964) pp. 1180–1188.

Hanewald, R. H., et al., "Metal Recovery from Spent Acid Solutions and Baghouse Bags Using the Inmetco Process," Residues and Effluents—Processing and Environmental Considerations, The Minerals, Metals & Materials Society, pp. 841–857 (1991).

Hashimoto, T., et al., "Development of a High Purity Zinc Carbonate Production Technology," *The Sumitomo Search*, No. 37, pp. 75–82 (Nov. 1988).

Hay, S. M., et al., "Recovery Of And Zinc From Blast Furnace And Basic Oxygen Furnace Dusts: A Laboratory Investigation," The Minerals, Metals & Materials Society, pp. 555–578 (1993).

Holley, C. A., et al., "New Process for Converting Steelmaking Fumes into Low–Zinc Pellets," Chicago Regional Meeting of American Iron and Steel Institute, pp. 87–94 (Oct. 16, 1969).

Huskonen, Wallace D., "Options and Opportunities: Update on K061, Choices for Handling Hazardous EAF Dust Now Include Recycling, Heavy Metal Recovery, and Processing Into Ceramic Materials," *Metal Producing*, (33), pp. 34, 36, 56 (Mar. 1992).

James, S. E., et al., "Recycling Lead and Cadmium, As Well As Zinc, From EAF Dust," Lead–Zinc '90, The Minerals, Metals & Materials Society, pp. 477–495 (1990).

Jolly, James H., "Zinc," *Minerals Facts and Problems*, pp. 1–18, U.S. Dept. of the Interior, Bureau of Mines 1985 Edition.

Keck, J. W., et al., "Leaching Composites of Five Plating Wastes with Ammonium Carbonate," EPD Congress '90, The Minerals, Metals & Materials Society, pp. 529–537 (1990).

Kern, P. L., et al., "The Waelz Process for Recovering Zinc and Lead from Steelmaking Dusts," Horsehead Resource Development Company, Inc., Palmerton, Pennsylvania, Presented at TMS Annual Meeting, Phoenix, AZ (1988).

Knights, Mikell, "EF Flue Dust Idea Eyed By Minimills", *American Metal Market*, Apr. 20, 1994.

Kola, R., "The Processing of Steelworks Waste," Lead–Zinc '90, The Minerals, Metals & Materials Society, pp. 453–464 (1990).

Kotraba, Norman L., et al., "High Quality Steel From Metallurgical Wastes," Extracting and Processing for the Treatment and Minimization of Wastes, The Minerals, Metals & Materials Society, pp. 521–531 (1993).

Kunda, W., et al., "Production Of Copper from The Ammine Carbonate System," Proceedings of the Extractive Metallurgy Division Symposium on Copper Metallurgy, Denver, Colorado, pp. 27–31 (Feb. 15–19, 1970).

Kunter, Richard S., et al., "The Cashman Process Treatment Of Smelter Flue Dusts," Residues and Effluents—Processing and Environmental Considerations, The Minerals, Metals & Materials Society, pp. 269–282 (1991).

Lehmkuhler, H. J., et al., "Reclamation Of Iron And Steelmaking Dusts, Sludges And Scales Using The Inmetco Technology," 21st Symposium on Pretreatment and Reclamation of Dusts, Sludeges and Scales in Steel Plants, Hamilton, Ontario, pp. 1–16 (May 11–13, 1993).

Lightfoot, Brian, et al., "Using Ausmelt Technology For Waste Treatment," Extraction and Processing for the Treatment and Minimization of Wastes, The Minerals, Metals & Materials Society, pp. 975–987 (1993).

Lindkvist, G. et al., "Elkem's Multi–Purpose Furnace Test Facility At Mefos And The Initial Operating Phase Of An Elkem HTMR System For EAF Dust," The Minerals, Metals & Materials Society, p. 161 (1991) (Abstract).

Litz, John E., "Flue Dusts: An Ideal Feed for Resource Recovery," Residues and Effluents—Processing and Environmental Considerations, The Minerals, Metals & Materials Society, pp. 223–238 (1991).

Mollison, A. C., et al., "Zinc Sulphide Pressure Leaching at Kidd Creek," Lead–Zinc '90, The Minerals, Metals & Materials Society, pp. 277–291 (1990).

"New Techniques Add Shine to Metal Processing," *Chemical Engineering*, pp. 37, 39 (Jun. 1992).

Nogueira, E. D., et al., "Winning Zinc Through Solvent Extraction And Electrowinning," *E&MJ*, pp. 92–94 (Oct. 1979).

Nyirenda, R. L., et al., "Dezincing and Detoxification of Electric Arc Furnace (EAF) Steelmaking Dust Via Ammonium Carbonate Leaching," EPD Congress 1993, The Minerals, Metals & Materials Society, pp. 893–905 (1992).

Nyirenda, R. L., et al., "Ammonium Carbonate Leaching of Reduced Electric Arc Furnace (EAF) Dust," The Minerals, Metals & Materials Society, pp. 163–177 (1991).

Olper, M., "The EZINEX® Process," The Minerals, Metals & Materials Society, pp. 513–519, 1993.

Olper, M., "The EZINEX® Process–A New And Advanced Way For Electrowinning Zinc From A Chloride Solution," *International Symposium—World Zinc '93*, pp. 491–494, Oct. 10–13, 1993.

Palumbo, F. J., et al., "Recovery of Metal Values from Copper Converter Flue Dust," U.S. Bureau of Mines, pp. i, iv–v, 1–10 (1985).

Pedersen, T., et al., "The Elkem Multi–Purpose Furnace," Lead–Zinc '90, The Minerals, Metals & Materials Society, pp. 857–879 (1990).Piret, N. L., et al., "Criteria for the Selection of a Recycling Process for Low Zinc–Containing Residuals from the Iron/Steel Industry," Residues and Effluents—Processing and Environmental Considerations, The Minerals, Metals & Materials Society, pp. 613–646 (1991).

Porter, F., "Metal Extraction Processes," *Zinc Handbook—Properties, Processing, and Use in Design*, Marcel Dekker, Inc., pp. 6–35, Marcel Dekker, Inc. (1991).

Prado, F. G., et al., "High Purity Zinc Oxide Production From Residues In Automobile Scrap Recycling," Ni Cobalt International Corporation, Lakeland, Florida, Symposium on Recycle and Secondard Recovery of Metals, TMS, 1985 pp. 183–193.

Prado, Faustino G., "High Purity Zinc Oxide From A Wide Range Of Industrial Residues," Second International Symposium—Recycling of Metals and Engineered Materials, The Minerals, Metals & Materials Society, pp. 529–537 (1990).

Prado, F. G., et al., "Indigenous Solids Reductants in Caron Type Nickel Plants," 25th Annual Conference of Metallurgists—1986, Toronto, Ontario, pp. 320–332 (Aug. 17–20, 1986).

Prado, F. G., et al., "Dezincing Galvanized Steel Using a Noncorrosive Low Energy Hydrometallurgical System," Prado & Associates, Inc., Tampa, Florida.

Prado, F. G., et al., "EAF Dusts: A Viable Complete Minimization," Extraction and Processing for the Treatment and Minimization of Wastes, The Minerals, Metals & Materials Society, pp. 543–553 (1993).

Robilliard, K. R., et al., "Sirosmelt Technology For Solving The Lead and Zinc Industry Waste Problem," Residues and Effluents—Processing and Environmental Considerations, The Minerals, Metals & Materials Society, pp. 331–348 (1991).

Stamantovic, Milan Lj., et al., "Recovery Of Zinc From Ironmaking Dusts by NaOH Leaching," Extraction and Processing for the Treatment and Minimization of Wastes, The Minerals, Metals & Materials Society, pp. 533–543 (1993).

Thomas, B. K., et al., "Leaching of Oxidic Zinc Materials with Chlorine and Chlorine Hydrate," *Metallurgical Transactions B*, vol. 12B, pp. 281–285 (Jun. 1981).

Tsuneyama, N., et al., "Production of Zinc Oxide for Zinc Smelting Process from EAF Dust at Shisaka Works," Lead–Zinc '90, The Minerals, Metals & Materials Society, pp. 465–476 (1990).

Weidner, Thoms H., et al., "Development and Application of the Green Pelletizing Process to Produce Agglomerates for BOF and Open Hearth Use," Mining & Processing Section, Research Department, Bethlehem Steel Corporation, Bethlehem, PA, pp. 72–76, ISS–AIME Conference, Wash., D.C., Mar. 25, 1980.

Yin, Ahi–biao, et al., "Copper Extraction From Smelter Flue Dust By Lime–Roast/Ammoniacal Heap Leaching," Residues and Effluents—Processing and Environmental Considerations, The Minerals, Metals & Materials Society, pp. 255–267 (1991).

"Zinc and Zinc–Lead Smelting," *Chemical & Process Technology Encyclopedia*, McGraw Hill (1974) pp. 1181–1184.

METHODS FOR RECYCLING ELECTRIC ARC FURNACE DUST

BACKGROUND OF THE INVENTION

This invention relates to methods and systems for treating dusts that are generated in steel production, the recycling of scrap metal, and other metallurgical operations. In particular, this invention relates to methods and systems for recovering lead, cadmium, and zinc from baghouse dust that is generated in steel production by electric arc furnace minimills. The methods and systems of the present invention recycle the dust to a form which can be further processed by the steel mill, and allow for the recovery of valuable components in the dust.

Baghouse dust is a mixture of metal oxides that are collected by scrubbers, electrostatic precipitators, bag filters, or other known filtering systems, in electric arc furnace (EAF) and blast furnace steel-making facilities and other iron-making plants. The dust, also called EAF dust, typically is composed mainly of oxides of iron, zinc, lead, tin, cadmium, chromium, manganese, nickel, copper, and molybdenum. Silica, lime and alumina may also be present in the dust.

Increasing levels of zinc in scrap steel due to the increased use of galvanized materials in automobile manufacture and keener competition for zinc free scrap have contributed to increased dust production. According to recent estimates, there were an estimated 600,000 tons of EAF dust generated from U.S. carbon steel operations in 1992. EAF operators are paying an average processing fee of $150 to $200 per ton of dust. Electric Arc Furnace Dust—1993 Overview, CMP Report No. 93-1, Arthur D. Little, Inc., July 1993. Annual disposal expenditures are said to approach $120 million for the industry.

The approaches that have been reportedly considered thus far for recycling or disposing of EAF dust fall into the following three general categories:
1) Briquetting, pelletizing or otherwise fixating the dust in a leachproof matrix and storing or disposing of the fixated product;
2) Reducing the dust with coal, methane or hydrogen at an elevated temperature and separating condensable zinc vapor from a nonvolatile slag, e.g., using a plasma furnace or a flame reactor process;
3) Removing the zinc by a hydrometallurgical process.

The first approach is not favored because it generates a disposable but nonsalable product. Furthermore, the dumping of untreated EAF dust in municipal landfills was banned in about 1988 under the Resource Conservation and Recovery Act (RCRA) due to the presence of leachable hazardous elements including lead, cadmium and chromium, which may enter the groundwater system and contaminate drinking water.

The majority of dust is presently treated by a thermal reduction process known as High Temperature Metal Recovery (HTMR) processing whereby the dust is transported as a hazardous material to an off-site processor for thermal treatment and removal of zinc and other metals. In the HTMR process known as the Waelz Kiln Process, which is practiced by Horsehead Resource Development Company, Inc. ("Horsehead") and is the most commercially successfully process known to date for treating EAF dust, the EAF dust, other wastes, coke or coal, lime and silica are mixed and fed to a rotary kiln furnace. The furnace is maintained at about 1100° to 1200° C. The zinc and other volatile non-ferrous metals in the feed are vaporized in the furnace off-gas and are carried from the furnace to an external dust collection system consisting of a cyclone and a baghouse. The resulting Waelz oxide is a crude zinc bearing product which is further refined by either a second kiln step where the material is further heated and sintered to form a zinc clinker material which is suitable for use in an electrothermal zinc furnace or is hot briquetted for use in an Imperial Smelting Furnace. Horsehead utilizes the former option and ships the resulting zinc product to Zinc Corporation of America, while Berzelius employs the latter option. A lead/cadmium by-product is shipped to another facility where the cadmium is recovered as a metal and the lead is recovered as lead sulfate which is then sent to a lead smelter. The other product of the furnacing operations is an iron rich slag which is considered suitable for road building applications.

The Waelz Kiln Process used by Horsehead is further described in S. E. James and C. O. Bounds, Recycling Lead and Cadmium, As Well as Zinc, From EAF Dust, in Lead-Zinc '90, Edited by Mackey and Prengaman, The Mineral, Metals & Materials Society, 1990, incorporated herein by reference in its entirety. Other variations of the Waelz Kiln Process are described in R. Kola, The Processing of Steelworks Waste, Lead-Zinc '90, Edited by Mackey and Prengaman, The Mineral, Metals & Materials Society, 1990; and N. Tsuneyama, M. Takewaki, and M. Yasukawa, Production of Zinc Oxide For Zinc Smelting Process From EAF Dust At Shisaka Works, Lead-Zinc '90, Edited by Mackey and Prengaman, The Mineral, Metals & Materials Society, 1990, all of which are incorporated herein by reference in their entireties.

Other examples of HTMR processes are described in Electric Arc Furnace Dust—1993 Overview, CMP Report No. 93-1, Arthur D. Little, Inc., July 1993 and briefly mentioned herein. The "HTR Process" utilizes a modified Waelz Kiln Process at 1400° C. In the HTR Process, zinc and other non-ferrous metals are volatilized and collected in a cyclone and baghouse. The solids exiting the kiln contain iron oxide and are sent to a landfill for burying. The "Zia Inclined Rotary Reduction System" uses a modified rotary kiln fired with oxy/gas burners and containing a bellied kiln. The zinc and lead metallic vapors leaving the furnace are recovered in a splash condenser. In the "INMETCO Process" pelletized material is fed into a rotary hearth furnace at 1225° C. where the pellets are sintered and several metals, including zinc, are vaporized. The vaporized metals are collected in a wet scrubber system as a sludge. The nonvolatile metals and the sintered slag are fed into a second furnace where the metal is smelted to produce an iron nickel chromium alloy.

The second (thermal reduction) approaches, including the Horsehead process, are problematic in that they necessitate costly, rather large, thermally insulated facilities and considerable energy expenditures, which render the technology impractical and cost ineffective for on-site treatment at most steel mini mills. Thus, the EAF operator incurs the costs, risks, and increased liability of shipping the dust as a hazardous waste to a regional treatment center. Neither the HTR or INMETCO process addresses the disposal of collected secondary dust.

The hydrometallurgical processes that are widely used for recovering zinc from iron-containing ores typically include selective dissolution (leaching), precipitation, filtration, and washing. Such processes are described in U.S. Pat. No. 5,028,410 ("Spink et al."), F. G. Prado, J. P. Dempsey, and B. W. Wiegers, High Purity Zinc Oxide Production From Residues In Automobile Scrap Recycling, Symposium on Recycle And Secondary Recovery Of Metals, The Minerals, Metals, & Materials Society, 1985, pp. 183–93, F. Prado, High Purity Zinc Oxide From A Wide Range Of Industrial Residues, Second Intern. Symposium—Recycling of Metal and Engineered Materials, Edited by van Linden, Stewart, Jr., and Sahai, The Minerals, Metals & Materials Society, 1990, F. G. Prado and F. L. Prado, EAF Dusts: A Viable Complete Minimization, Extraction and Processing for the Treatment and Minimization of Wastes, Edited by Hager, Hansen, Imrie, Pusatori, and Ramachandran, The Minerals, Metals & Materials Society, 1993, the disclosures of which are hereby incorporated by reference in their entireties.

Although hydrometallurgical approaches theoretically involve the least costly equipment and the least expenditures of energy, such processes generate excessive amounts of environmentally objectionable effluents and often require processing conditions which pose potential safety and health hazards to the worker. In addition, EAF dusts typically contain a substantial portion of zinc in the form of zinc ferrite ($ZnFe_2O_4$) which cannot easily be decomposed into separate iron and zinc constituents and which is substantially insoluble in most solvents. Thus, another problem with hydrometallurgical approaches is that it is often difficult to achieve separation of zinc from zinc ferrite without using extreme process conditions (solvents, temperature, pH) which also tend to dissolve unwanted contaminants which further interfere with the treatment process. As a result, the percentage recovery of zinc by hydrometallurgical processes tends to be rather low.

For example, in U.S. Pat. No. 4,071,357 ("Peters"), Peters describes a leaching method to recover zinc oxide from steel-making flue dust using ammonia and carbon dioxide. In Table I, Peters reports that only 54.7 % of the zinc from the dust went into solution after 4 hours of leaching. Thus, a substantial portion of the zinc remained in the leach residue. In U.S. Pat. No. 5,204,084 ("Robinson et al."), Robinson reports that only 61.2% of the zinc in a roasted zinc sulphide concentrate was extracted in an ammonia ammonium carbonate solution.

In an article by Nyirenda et al., Ammonium Carbonate Leaching of Reduced Electric Arc Furnace (EAF) Dust, Residues and Effluents—Processing and Environmental Considerations, Edited by Reddy, Imrie, and Queneau, The Minerals, Metals & Materials Society, 1991, the authors heated a sample of EAF dust in a furnace at 650° C. using a mixture of $CO_2/CO$ gas for 90 minutes. The reduced product was then leached using ammonia ammonium carbonate solution. The solution dissolved 70% of the zinc and 25% of the iron. Nyirenda also reduced a mixture of pure zinc oxide and pure wustite at the same conditions and then leached the reduced product. He reported that 80% of the zinc and 10% of the iron entered the solution.

A method for treating neutral leach residues using an Ausmelt submerged lance reactor is described by Altepeter and James in Proposed Treatment Of Neutral Leach Residue At Big River Zinc, Residues and Effluents—Processing and Environmental Considerations, Edited by Reddy, Imrie, and Queneau, The Minerals, Metals & Materials Society, 1991. In this method, moist residue is smelted in an agitated slag bath, and then coal is added to the slag bath which is then reduced at 1400° C. The zinc rich fume was collected in a baghouse and leached with sulfuric acid.

Accordingly, it is an object of this invention to provide methods and systems for the treatment of raw materials, especially EAF dust, which separates and recycles lead, cadmium, zinc, and iron, in commercially useable forms, and which generates substantially no environmentally objectionable waste stream.

It is another object of this invention to provide methods and systems which separate and recover substantially all of the zinc from the zinc ferrites and zinc oxides in EAF dust.

It is another object of this invention to provide methods for separating and recycling zinc from EAF dust, whereby zinc is recovered in the form of zinc oxide.

It is another object of this invention to provide methods and systems for the treatment of EAF dust which can be utilized on or adjacent to the premises of a steel making mill, thereby avoiding the need to transfer the EAF dust to a separate off-site location, and reducing the EAF operator's costs and potential liability associated with transporting hazardous materials.

SUMMARY OF THE INVENTION

These and other objects are satisfied by the invention which is characterized by treating raw material, such as EAF dust, which comprises a mixture of metals, with a unique combination of pyrometallurgical and hydrometallurgical treatment steps, to separate and recover metals selected from the group consisting of iron, cadmium, zinc, and lead.

Briefly, in steps (A) and (B) of the method, the raw material is roasted at elevated temperatures in a reducing furnace. In the reducing furnace, the zinc and cadmium present in the raw material are reduced to the metallic state, substantially vaporized, reoxidized in the vapor space in the furnace, and are subsequently collected in a baghouse or similar device. Although the lead and lead containing compounds in the raw material are below their boiling temperatures, the lead and lead containing compounds typically have vapor pressures sufficient to permit them to "evaporate" into the vapor stream and enter into the baghouse. In addition, if any chlorides are present in the raw material, lead will readily form lead chloride which vaporizes at about 950° C. The iron present in the raw material is reduced to metallic iron and remains in the residual sinter mass. Subsequently, the residual sinter mass, which also may contain slag, is cooled, briquetted, and returned to a steel making electric arc furnace for recovery as steel.

Next, several hydrometallurgical techniques are applied to treat the material collected in the baghouse (also referred to herein as "secondary dust"). First, the baghouse material is treated with an aqueous solution of ammonia ammonium carbonate to separate zinc and cadmium from lead particles contained therein, lead being substantially insoluble in the ammonia ammonium carbonate solution. The lead containing particles are filtered from the leachate and subsequently shipped to a lead smelter. In a preferred embodiment, the leachate contains a relatively high percentage of lead carbonate and is particularly suitable for recycling by lead smelters recycling car batteries. Alternatively, the lead carbonate may be calcined to produce lead oxide and $CO_2$, the $CO_2$ then being used to reconstitute the ammonia ammonium carbonate solution. In a separate step, zinc metal is added to the leachate to produce a cadmium containing cement which is subsequently separated from the leachate. The impure cadmium cement can be further treated by a cadmium refiner. Next, ammonia is stripped from the leachate to precipitate basic zinc carbonate which can then be calcined to produce zinc oxide. Zinc oxide generally is preferred over zinc metal (which is produced by some of the prior art processes mentioned above) because zinc oxide typically has a higher resale value than zinc metal.

Although the separate pyrometallurgical and hydrometallurgical steps recited above are well known in the art, Applicant has discovered that by combining the techniques into a single treatment process, substantially complete separation and recovery of lead, cadmium, zinc, and iron from raw materials containing mixtures of metals, especially EAF dusts, could be achieved. The problems associated with the inability of prior art hydrometallurgical processes to separate zinc from zinc ferrites (and prevent the reformation of zinc ferrites) could be overcome by first heating the raw materials to a temperature which substantially vaporizes lead, cadmium and zinc, and leaves metallic iron behind in the residual sinter mass in the furnace chamber. The present method effectively destroys zinc ferrites in the raw material sample.

According to a preferred embodiment of the method of the present invention, the heating step (A) may be conducted in a continuous belt furnace which is smaller and less expensive than the rotary furnaces and kilns used in prior art processes. Thus, the entire process (or any portion thereof) can readily be carried out "on-site", for example, on or adjacent to the premises of a steel mini-mill. Moreover, the only hazardous by-products which would require transportion off-site for further treatment are the lead and cadmium containing byproducts which typically amount to about 3% of the sample being treated. Thus, the present method results in a substantial reduction in the interstate and intrastate shipment of hazardous wastes.

The present invention allows for recycling of substantially all the dust into useable, commercially valuable components. Zinc, lead, and cadmium contained in the dust are recovered separately in commercial forms. The iron oxides contained in the primary dust are converted to the metallic state in the residual sinter mass and subsequently recycled to the electric arc furnace, along with the slag forming components in the sinter mass, for recovery as steel, rather than merely road fill. Substantially the only elements in the dust which are not converted into commercial products are sodium, potassium, chlorine, and sulfur (including sulfates), which exit the process in the dilute brine stream. Accordingly, the methods of the invention avoid the need to dispose of any materials in a landfill.

BRIEF DESCRIPTION OF THE DRAWINGS

A full understanding of the invention can be gained from the following description of the preferred embodiments when read in conjunction with the accompanying drawing in which.

DETAILED DESCRIPTION OF THE INVENTION

Figure 1:
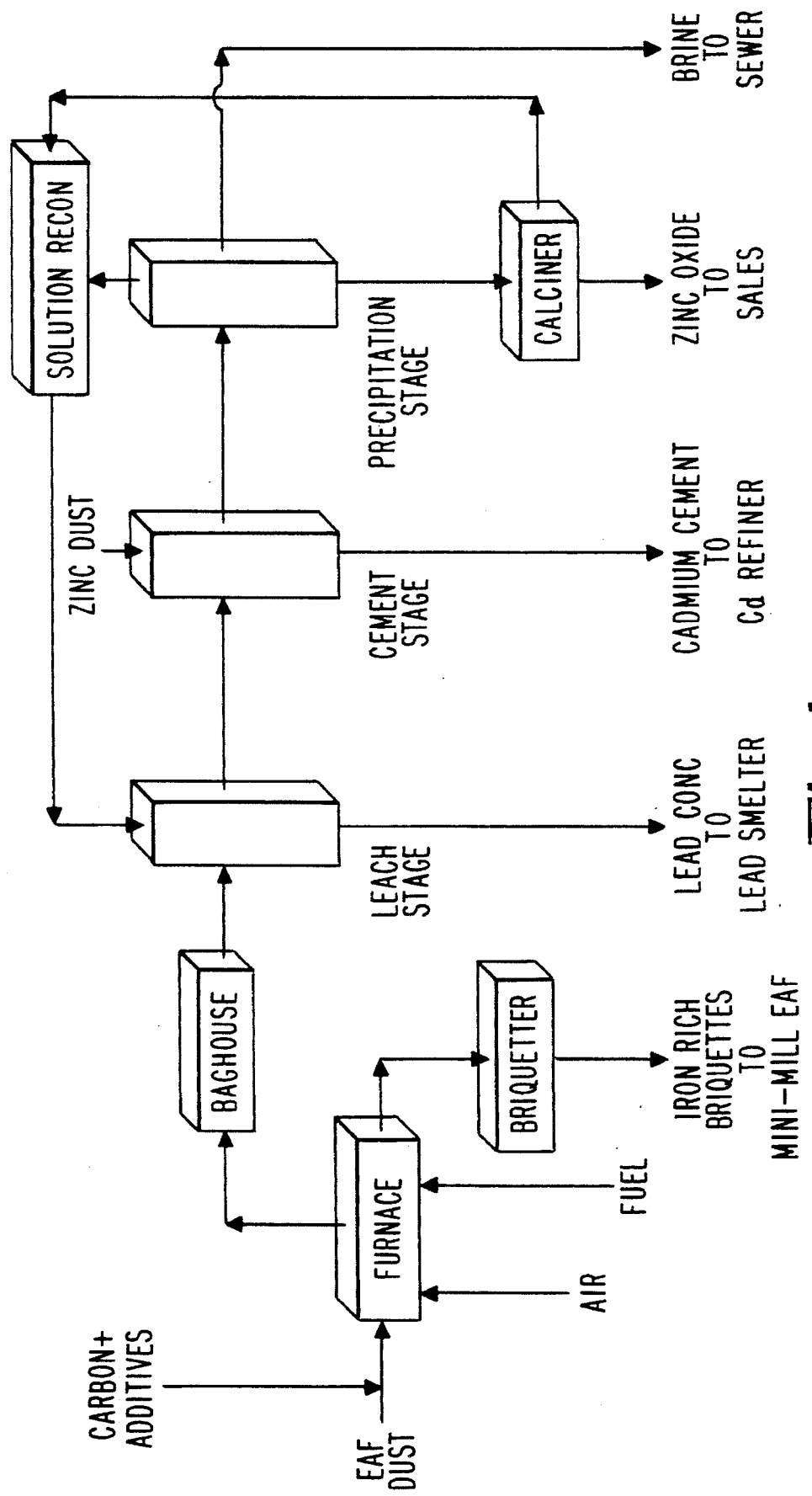
FIGURE 1 is a block flow diagram showing the steps of a preferred method for separating and recovering iron, cadmium, zinc, and lead, from EAF dust.

The present invention relates to a method and system for the separation and recovery of metals selected from the group consisting of iron, cadmium, zinc, and lead, from raw material comprising a mixture of metals. The raw materials which may be treated according to the methods of the present invention include metal ores, neutral leach residues, electric arc furnace dust, foundry dust, blast furnace dust, and recovered metallic powders. The embodiment of the process illustrated in the drawing is especially useful for treating EAF dust.

The present invention is characterized by a method comprising the steps of:

A. heating said raw material to a temperature sufficient to substantially vaporize cadmium, zinc, and lead, and insufficient to substantially vaporize iron;

B. separating secondary dust and said vapors produced during step (A) from the residual sinter mass, which mass comprises iron;

C. slurrying said secondary dust in an aqueous solution of ammonia ammonium carbonate to dissolve zinc and cadmium;

D. separating a zinc/cadmium bearing leach liquor from substantially insoluble lead containing particles by filtration;

E. treating the zinc/cadmium bearing leach liquor to recover cadmium by adding metallic zinc to the leachate to produce a cadmium containing cement;

F. separating said cement from said leach liquor; and

G. removing ammonia from the leach liquor to precipitate basic zinc carbonate.

The steps of (A) heating the raw material to a temperature sufficient to substantially vaporize cadmium metal, zinc metal, and lead, and insufficient to substantially vaporize iron, and then (B) separating the secondary dust and vapors produced during the first step from the residual sinter mass, are known those skilled in the art and may be preformed any number of ways. However, it is imperative that, in the heating step, the zinc, cadmium and lead present in the raw material are vaporized, and ultimately collected in a collecting device, and further that the iron present in the raw material feedstock is metallized, such that the iron remains in the residual sinter mass, thereby effecting separation of iron from lead, cadmium and zinc in the mixture. Preferably, the vapor stream/secondary dust comprises less than about 3% iron, even more preferably less than 1% iron, and most preferably, less than 0.5% iron.

Typically the raw material is heated to a temperature in the range of between about 900° to 1250° C., preferably between about 1000° and 1200° C., and most preferably about 1100° C., for between about 10 to 120 minutes, preferably between about 15 to 60 minutes, and most preferably for about 30 minutes. The raw material may be heated in any suitable device which are known to those skilled in the art, including reduction furnaces, and further including rotary hearth furnaces, inclined rotary reduction furnaces, flame reactor furnaces, circulating fluid bed reactors, plasma arc furnaces, submerged lance furnaces, or continuous belt furnaces, with flame reactor furnaces, circulating fluid bed reactors, plasma arc furnaces, submerged lance furnaces, or continuous belt furnaces being preferred, and "quiet" (i.e., no agitation) continuous belt furnaces being more preferred. Suitable processes for heating the raw mixtures are described in R. Kola, The Processing of Steelworks Waste, Lead-Zinc '90, Edited by Mackey and Prengaman, The Mineral, Metals & Materials Society, 1990; N. Tsuneyama, M. Takewaki, and M. Yasukawa, Production Of Zinc Oxide For Zinc Smelting Process From EAF Dust At Shisaka Works, Lead-Zinc '90, Edited by Mackey and Prengaman, The Mineral, Metals & Materials Society, 1990, S. E. James and C. O. Bounds, Recycling Lead and Cadmium, As Well as Zinc, From EAF Dust, in Lead-Zinc '90, Edited by Mackey and Prengaman, The Mineral, Metals & Materials Society, 1990, K. H. Bauer, et al., Recycling Of Iron And Steelworks Wastes Using The INMETCO Direct Reduction Process, MPT-Metallurgical Plant And Technology International, No. 4, pp. 74–87 (1990), N. L. Piret, D. Muller, Criteria For The Selection Of A Recycling Process For Low Zinc-Containing Residuals From The Iron/Steel Industry, Residues And Effluents—Processing And Environmental Considerations, Edited by Reddy, Imrie and Queneau, The Mineral, Metals & Materials Society, 1991, R. H. Hanewatd, W. A. Munson, Jr. and D. L. Schweyer, Metal Recovery From Spent Acid Solutions And Baghouse Bags Using The Inmetco Process, Residues And Effluents—Processing And Environmental Considerations, Edited by Reddy, Imrie and Queneau, The Mineral, Metals & Materials Society, 1991, and C. A. Holley and T. H. Weidner, New Process For Converting Steelmaking Fumes Into Low-Zinc Pellets, Presented at Chicago Regional Technical Meeting of America Iron and Steel Institute, Oct. 16, 1969, all of which are incorporated herein by reference in their entireties.

Alternatively, the heating steps of the HTR Process, and the Zia Process, referred to above, also are suitable for use in the present methods. The pyrometallurgical process described by Altepeter and James in Proposed Treatment Of Neutral Leach Residue At Big River Zinc, Residues and Effluents —Processing and Environmental Considerations, Edited by Reddy, Imrie, and Queneau, The Minerals, Metals & Materials Society, 1991, which is incorporated herein by reference in its entirety, may also be utilized in practicing steps (A) and (B) of the present invention.

When utilizing a furnace which produces a metallic zinc and lead vapor, such as a plasma arc furnace or an inclined rotary reduction furnace, the resulting vapors and secondary dust preferably should be oxidized prior to collecting the vapors/secondary dust in the collecting device and prior to leaching those vapors/secondary dust with ammonia ammonium carbonate solution, in order to convert the metallic vapors present therein to an oxide state. Conversion of any metallic zinc and lead which is present in the vapor/secondary dust to an oxide prevents the highly undesirable liberation of hydrogen during leaching and facilitates solubility of the secondary dust in the leachate.

In a preferred method, prior to heating in the first step of the process, the raw material containing the mixture of metals may be mixed with a source of carbon, such as coal breeze, coal, coke, delayed petroleum coke, and fluidized petroleum coke, and various additives known to those skilled in the art to enhance the separation of lead, cadmium and zinc from iron, including for example, limestone, silica (silicon dioxide), calcium chloride, sulfates, and the like. The mixture is then fed to a quiet continuous belt furnace and heated for about 30 minutes at a temperature of about 1100° C. While not intending to be bound to any theory, it is believed that while in the furnace, the zinc, cadmium, lead, and iron oxides are reduced to the metallic state by carbon. Zinc and cadmium (in the metallic state) are above their respective boiling points and vaporize. Lead and lead containing compounds have sufficient vapor pressure allowing them to evaporate into the vapor stream. The gas stream above the bed of dust contains the metal vapors and also is rich in CO gas. Preheated air may be introduced into the furnace to convert CO to $CO_2$, thereby reducing the furnace's fuel requirements. The preheated air also converts the metal vapors to their oxides which are eventually collected in a collecting device, such as a baghouse or a wet scrubber after they leave the furnace. Generally, a baghouse is preferred, although a wet scrubber may be more appropriate when the raw material to be treated contains substantial amounts of chlorides, and particularly if the chlorides are to be recycled to the reduction furnace.

The residual sinter mass remaining in the furnace comprises metallic iron and slag. The iron content of the sinter mass depends upon the composition of the raw material being treated. For example, theoretically a sample of EAF dust containing about 27% iron should produce a sinter mass containing about 51% iron. The mass is cooled to prevent reoxidation of the iron, briquetted, and returned to the steel making electric arc furnace for further production of steel.

Next, the secondary dust and vapors which are collected in the baghouse or similar device are treated with a series of hydrometallurgical steps to separate and recycle the zinc, cadmium and lead contained therein. Such techniques which are suitable for use in the present process are described in U.S. Pat. No. 4,071,357 ("Peters"), U.S. Pat. No. 5,204,084 ("Robinson et al."), U.S. Pat. No. 5,028,410 ("Spink et al."), Nyirenda et al., Ammonium Carbonate Leaching of Reduced Electric Arc Furnace (EAF) Dust, Residues and Effluents—Processing and Environmental Considerations, Edited by Reddy, Imrie, and Queneau, The Minerals, Metals & Materials Society, 1991, F. G. Prado, J. P. Dempsey, B. W. Wiegers, High Purity Zinc Oxide Production From Residues In Automobile Scrap Recycling, Symposium on Recycle And Secondary Recovery Of Metals, The Minerals, Metals, & Materials Society, 1985, pp. 183–93, F. Prado, High Purity Zinc Oxide From a Wide Range Of Industrial Residues, Second Intern. Symposium—Recycling of Metal and Engineered Materials, Edited by van Linden, Stewart, Jr., and Sahai, The Minerals, Metals & Materials Society, 1990, F. G. Prado and F. L. Prado, EAF Dusts: A Viable Complete Minimization, Extraction and Processing for the Treatment and Minimization of Wastes, Edited by Hager, Hansen, Imrie, Pusatori, and Ramachandran, The Minerals, Metals & Materials Society, 1993, the disclosures of which are hereby incorporated by reference in their entireties.

In a preferred embodiment, the material collected in the baghouse (also referred to herein as "secondary dust") is slurried in an aqueous solution of ammonia ammonium carbonate. Preferably, the secondary dust is slurried in an ammonia ammonium carbonate leaching solution containing from about 50 to 200 g/liter of ammonia, preferably about 75 to 150 g/liter, more preferably about 100 to 140 g/liter, and most preferably about 120 g/liter ammonia. The solution should also contain between about 50 to 150 g/liter carbon dioxide, preferably between about 75 to 125 g/liter, and most preferably about 100 g/liter $CO_2$. The solution should be maintained below its boiling point, yet at a temperature which is sufficient to maintain an acceptable reaction rate. Preferably, the solution is maintained at a temperature in a range of between about 30° to 60° C., preferably between about 40° to 60° C., and most preferably between about 50° to 55° C.

The zinc and cadmium contained in the secondary dust will substantially dissolve in the ammonia ammonium carbonate solution, whereas lead and lead containing compounds generally do not. The resulting leachate is then filtered to separate the pregnate leachate from the filter cake which is rich in lead carbonate. The filter cake may then be transported to a lead smelter for further processing.

Next, zinc powder or dust is added to the pregnant leachate in an amount sufficient to substantially cement out impure cadmium metal. The zinc/cadmium bearing leach liquor may treated by several cadmium cementation stages. Typically only one stage is required due to the low cadmium content of the sample. The cement can be sold to a cadmium refiner for further processing.

Next, ammonia is stripped from the leachate, resulting in a solution comprising basic zinc carbonate precipitate ("$2ZnCO_3 * 3Zn[OH]_2$"). The solution may further comprise ammonium chloride, and various sulfate, sodium, and potassium contaminates. The stripped ammonia may be combined with carbon dioxide from the zinc oxide calciner to reconstitute the ammonia ammonium carbonate solution and returned to the means for leaching.

The basic zinc carbonate is then calcined in a rotating kiln or a fluidized bed, thereby driving off water and carbon dioxide, and forming zinc oxide, the latter being a commercially valuable, highly desirable product. Sodium or potassium contaminates remain in solution after the basic zinc carbonate precipitation step, and may leave the process as chlorides or sulfates in a dilute brine stream. This brine stream is the only material which is not recycled for further commercial markets. The brine stream may be discharged into a sewage system, or alternatively, excess heat from the reduction furnace could be utilized to evaporate the water, leaving a salt which may be suitable for use on roadways.

Sodium carbonate also may be added to the solution to form sodium chloride, carbon dioxide, and ammonia. The ammonia and carbon dioxide are stripped from the solution and the sodium chloride containing solution is discharged into a sewer.

Although the methods of the invention may not remove some metallic elements in EAF dust which may be considered to be impurities in steel, such as for example, copper, nickel, tin, and chromium, these elements will remain with the residual sinter mass. However, depending upon the end uses for which the steel is intended, the EAF steel makers do not necessarily regard the presence of these element as being problematic.

In addition, the methods of the invention may not remove all the lead, zinc, and cadmium contained in the EAF dust. Preferably, the methods of the invention will separate and recover about 70% of the lead, 90% percent of the cadmium, and 90% of the zinc, more preferably about 80% lead, 98% cadmium, 98% zinc, most preferably about 85% lead, at least about 99% cadmium, and at least about 99% zinc, from the raw material being treated. Of course, any lead, cadmium, or zinc remaining in the residual sinter mass can be recycled through the inventive process for further treatment.

Although the methods of the invention are particularly suited for treating EAF dust, the methods of the invention can also be used to treat the neutral leach residue by-products of zinc electrowinning generated by zinc smelting plants. The products recovered from the treated neutral leach residue include zinc oxide, cadmium cement, lead carbonate, and a slag which is rich in metallic iron and also contains aluminum and silicon oxides. The slag could be used as a feedstock for the steel industry. One advantage of using the methods of the present invention to treat neutral leach residues is that the problems associated with disposal of leach residues and the jarosite, hematite, or goethite by-products of a hot acid leach are avoided. Another advantage is that it is possible to separate and recover substantially all the zinc from the neutral leach residues, including that zinc which exists in ferrite form. Thus, the zinc smelter is able to process ores having higher iron contents.

EXAMPLE

A sample of EAF dust containing 14.7 weight percent zinc, 1.6 weight percent lead, 0.04 weight percent cadmium, and 30.1 weight percent iron was mixed with coal breeze, silicon dioxide, and corn starch (as a binder), and then pelletized. Six different samples were reduced in a continuous belt furnace which was maintained at 1000° C., for 2 hours, with no agitation, and a nitrogen purge of 0.5 feet per second above the pellets.

EAF dust has a dark brown color. After the reduction step, two of the samples had a rust color, which indicates that the iron in these samples was not sufficiently reduced. Accordingly, further testing of these examples was not completed.

The other four samples turned a dark grey color. These samples were analyzed to determine the amount of zinc, cadmium and lead removed from the sample as a result of the heating step. The results are reported in Table 1 below.

TABLE 1

| | | | | |
|---|---|---|---|---|
| Carbon, dry wt. % | 11.7 | 15.8 | 11.0 | 14.1 |
| $SiO_2$ dry wt. % | 0.0 | 0.0 | 6.0 | 5.8 |
| Percent Removed | | | | |
| Zinc | 92 | 98 | 93 | 98 |
| Cadmium | 99 | 99 | 99 | 99 |
| Lead | 42 | 38 | 59 | 50 |

Although an iron analysis was not performed on the secondary dust generated, Applicant believes that the majority of the zinc ferrites in the EAF dust were destroyed.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

What is claimed:

1. An on-site method for the separation and recovery of metals selected from the group consisting of iron, cadmium, zinc, and lead, from raw material comprising a mixture of iron, cadmium, zinc and lead, said method comprising the steps of:

A. heating said raw material in the presence of carbon and an additive selected from the group consisting of limestone, silica, calcium chloride, and sulfates, to a temperature in the range of between about 1000° to 1200° C. to substantially reduce and vaporize cadmium, zinc, and lead without substantially vaporizing iron, thereby producing vapors containing cadmium, zinc, and lead, and an iron-containing-residual sinter mass;

B. contacting said vapors produced in Step (A) with preheated air to produce dust containing oxidized cadmium, zinc, and lead, and then separating said dust from said iron-containing-residual sinter mass by collecting said dust in a receptacle;

C. slurrying said dust in an aqueous solution of ammonia ammonium carbonate to produce substantially insoluble lead-containing-precipitates and a zinc/cadmium bearing leach liquor;

D. separating said zinc/cadmium bearing leach liquor from said substantially insoluble lead-containing-precipitates by filtration;

E. adding metallic zinc to the zinc/cadmium bearing leach liquor to produce a cadmium-containing-cement;

F. separating said cement from said leach liquor; and

G. removing ammonia from said leach liquor to precipitate basic zinc carbonate.

2. A method in accordance with claim 1 wherein the raw material is selected from the group consisting of metal ore, neutral leach residues, electric arc furnace dust, foundry dust, blast furnace dust, and recovered metallic powders.

3. A method in accordance with claim 1 wherein the raw material is electric arc furnace dust.

4. A method in accordance with claim 1 wherein raw material is heated in a rotary hearth furnace, inclined rotary reduction furnace, circulating fluid bed reactor, a submerged lance furnace, or a continuous belt furnace.

5. The method of claim 1 wherein said raw material is heated in a continuous belt furnace.

6. The method of claim 1 wherein said raw material is heated for between about 10 to 120 minutes.

7. The method of claim 1 whereby, in step (G), said leach liquor is steam stripped to precipitate basic zinc carbonate.

8. The method of claim 1 further including the step of calcining said zinc carbonate to produce zinc oxide.

9. The method of claim 1 wherein each of steps (A) through (G) are conducted on, or adjacent to, the premises of electric arc furnace steel mill facilities.

10. The method of claim 1 wherein the dust produced in Step (B) is collected in a baghouse.

11. The method of claim 1 wherein the dust produced in Step (B) is collected in a wet scrubber.

12. The method of claim 1 wherein said residual sinter mass further comprises slag.

13. The method of claim 1 further comprising the step of cooling and briquetting said sinter mass.

14. The method of claim 13 further comprising the step of recycling the briquettes to a steel making electric arc furnace for production of steel.

15. The method of claim 1 wherein Step (C) comprises slurrying said dust in an aqueous solution of ammonia ammonium carbonate containing about 120 g/liter ammonia, about 100 g/liter carbon dioxide, at a temperature in a range of between about 50° to 55° C.

* * * * *